United States Patent
Sakane et al.

(10) Patent No.: US 9,605,714 B2
(45) Date of Patent: Mar. 28, 2017

(54) MACHINING APPARATUS FOR MACHINING END FACE OF TAPERED ROLLER AND GRINDING WHEEL BODY

(71) Applicants: JTEKT CORPORATION, Osaka-shi, Osaka (JP); MIZUHO CO., LTD., Jyoyo-shi, Kyoto (JP)

(72) Inventors: Munesato Sakane, Kashiwara (JP); Takanori Murakami, Kashiwara (JP); Takao Ochi, Kizugawa (JP)

(73) Assignees: JTEKT CORPORATION, Osaka (JP); MIZUHO CO., LTD., Kyoto (JP)

( * ) Notice: Subject to any disclaimer, the term of this patent is extended or adjusted under 35 U.S.C. 154(b) by 1 day.

(21) Appl. No.: 14/676,049

(22) Filed: Apr. 1, 2015

(65) Prior Publication Data

US 2015/0285303 A1  Oct. 8, 2015

(30) Foreign Application Priority Data

Apr. 7, 2014  (JP) ................. 2014-078912

(51) Int. Cl.
| | |
|---|---|
| B24B 5/00 | (2006.01) |
| F16C 33/36 | (2006.01) |
| B24B 7/16 | (2006.01) |
| B24B 7/04 | (2006.01) |

(52) U.S. Cl.
CPC .............. *F16C 33/366* (2013.01); *B24B 7/04* (2013.01); *B24B 7/16* (2013.01); *F16C 2220/70* (2013.01)

(58) Field of Classification Search
USPC .................. 451/242, 245, 324, 332, 333
See application file for complete search history.

(56) References Cited

U.S. PATENT DOCUMENTS

| | | | | |
|---|---|---|---|---|
| 2,378,271 A | * | 6/1945 | Whelldon, Jr. .......... | B24D 7/04 451/548 |
| 2,551,568 A | * | 5/1951 | Roshong ................. | B24B 11/00 125/11.03 |
| 3,859,756 A | * | 1/1975 | Zerbola .................. | B24B 7/162 451/269 |

(Continued)

FOREIGN PATENT DOCUMENTS

| | | |
|---|---|---|
| JP | 2002-086336 A | 3/2002 |
| JP | 2003-120687 A | 4/2003 |
| JP | 2005-297181 A | 10/2005 |

*Primary Examiner* — Joseph J Hail
*Assistant Examiner* — Shantese McDonald
(74) *Attorney, Agent, or Firm* — Oliff PLC (57) ABSTRACT

A machining apparatus includes a transfer mechanism portion and a grinding wheel unit. The transfer mechanism portion transfers a tapered roller having a large end face directed outward in a radial direction by causing the tapered roller to revolve about a vertical line while causing the tapered roller to rotate. The grinding wheel unit is substantially C-shaped, and has a grinding wheel surface that comes in sliding contact with the large end face of the transferred tapered roller on an inner peripheral side thereof. The grinding wheel unit has a substantially C-shaped seat fixed to an apparatus main body, and a grinding wheel body that is separate from the seat and is detachably mounted to the seat. The grinding wheel body is substantially C-shaped, and has the grinding wheel surface on an inner peripheral side thereof. The grinding wheel body is constituted by segments disposed along a circumferential direction.

6 Claims, 9 Drawing Sheets

(56) References Cited

U.S. PATENT DOCUMENTS 3,889,428 A * 6/1975 Steinegger .............. B24B 7/162
  451/261
2005/0233683 A1 10/2005 Kamamura et al.

* cited by examiner

MACHINING APPARATUS FOR MACHINING END FACE OF TAPERED ROLLER AND GRINDING WHEEL BODY

INCORPORATION BY REFERENCE

The disclosure of Japanese Patent Application No. 2014-078912 filed on Apr. 7, 2014 including the specification, drawings and abstract is incorporated herein by reference in its entirety.

BACKGROUND OF THE INVENTION

1. Field of the Invention

The invention relates to a machining apparatus for machining an end face of a tapered roller, and a grinding wheel body used in the machining apparatus.

2. Description of Related Art

In a tapered roller bearing, a large end face (a bottom surface of a cone) of a tapered roller comes in sliding contact with a collar portion provided at an end portion of an inner ring in an axial direction, and hence the large end face is subjected to finishing for reducing a frictional resistance. An example of an apparatus for machining the large end face includes a machining apparatus disclosed in Japanese Patent Application Publication No. 2005-297181 (JP 2005-297181 A).

Figure 9:
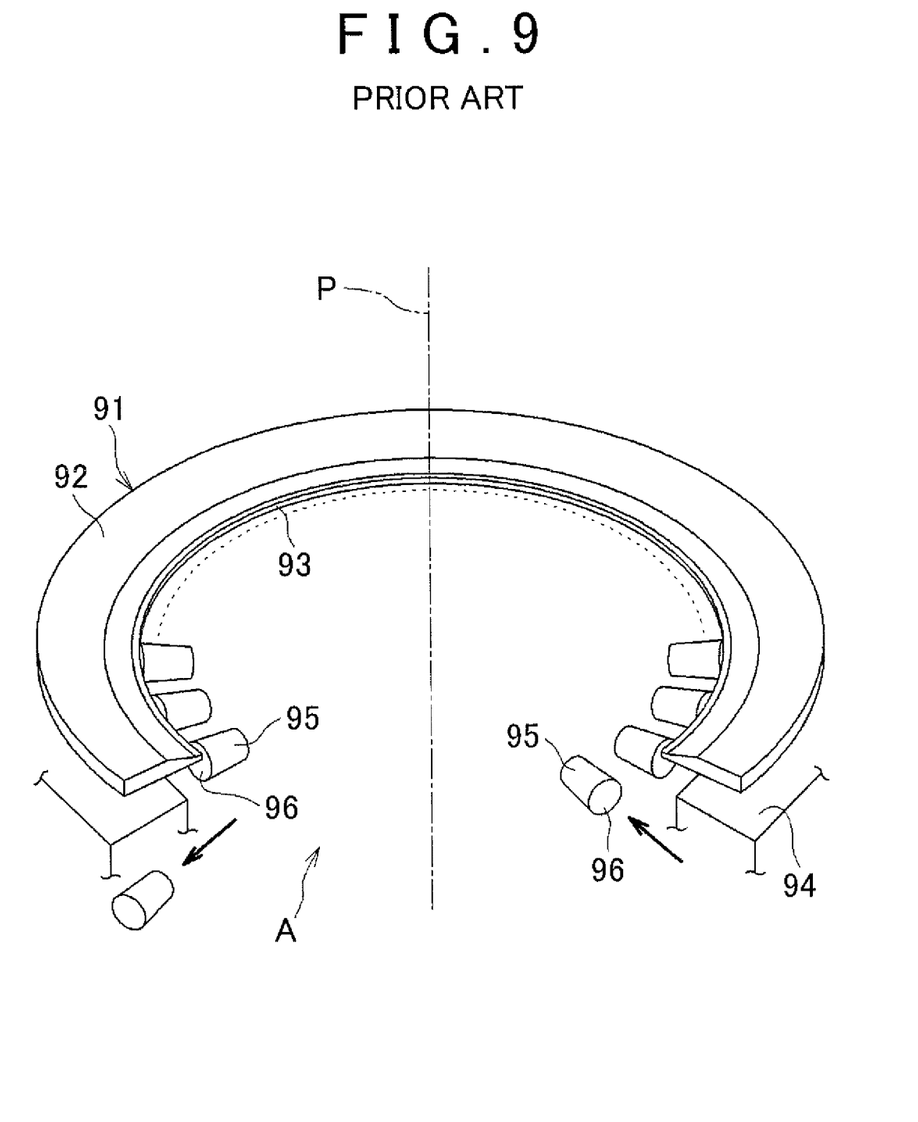
FIG. 9 is an explanatory view of a conventional machining apparatus.

In addition, the machining apparatus for machining the large end face of the tapered roller includes a machining apparatus shown in FIG. 9. The overall shape of the machining apparatus is substantially circular, and the machining apparatus includes a grinding wheel 91 in a shape obtained by removing a part of the circle (also referred to as a C-shape or a horseshoe shape). The grinding wheel 91 has a C-shaped base metal portion 92 made of steel and a grinding wheel portion 93 fixed along the inner periphery of the base metal portion 92.

In the machining apparatus, a tapered roller 95 is successively loaded from a part of an area A in which the grinding wheel 91 is absent (the right side in the area A in the case of FIG. 9), and a large end face 96 is brought into sliding contact with the grinding wheel portion 93 while the loaded tapered roller 95 is caused to revolve about a vertical line P with the large end face 96 directed outward in a radial direction, whereby it becomes possible to machine the large end face 96. Note that the revolving tapered roller 95 also rotates on its roller axis. The tapered roller 95 makes substantially one revolution along the inner peripheral surface of the grinding wheel 91, and the machining of the large end face 96 is thereby completed, and the tapered roller 95 of which the machining is ended is successively ejected from the other part of the area A (the left side in the area A in the case of FIG. 9).

The grinding wheel 91 is installed so as to be detachable from an apparatus main body 94 of the machining apparatus for maintenance management. For example, the base metal portion 92 of the grinding wheel 91 is fixed to the apparatus main body 94 using a jig including a bolt or the like that is not shown, and the grinding wheel 91 can replaced by detaching the bolt.

When the machining of the large end face 96 of the tapered roller 95 is continuously performed by using the machining apparatus that includes the grinding wheel 91 shown in FIG. 9, degradation such as that abrasive grains of the grinding wheel portion 93 are flattened or become blunt or that the grinding wheel portion 93 (grinding wheel surface) is worn and its radius (inner diameter) is increased occurs. In this case, the large end face 96 cannot obtain a desired shape or machining accuracy is reduced.

In addition, in the case where the machining of the large end face 96 is performed by using the above machining apparatus, in particular, in an area on a side of the end of the machining (the left side in the case of FIG. 9), the machining accuracy of the large end face 96 is significantly influenced. To cope with this, as described above, in the case where the grinding wheel portion 93 is degraded and the machining accuracy of the large end face 96 is reduced, the maintenance management is required particularly in the part of the grinding wheel 91 on the side of the end of the machining. In the related art shown in FIG. 9, the grinding wheel portion 93 is fixed to the base metal portion 92, and hence, in the case where, e.g., the replacement is performed as the maintenance management, it is not possible to replace only the part of the grinding wheel portion 93 on the side of the end of the machining, and it is necessary to replace the entire grinding wheel 91 including the grinding wheel portion 93 and the base metal portion 92.

SUMMARY OF THE INVENTION

The invention provides for allowing the maintenance management of a part of the substantially circular grinding wheel instead of the maintenance management of the entire grinding wheel, and the grinding wheel body for realizing the maintenance management thereof.

A machining apparatus for machining an end face of a tapered roller of a first aspect of the invention is a machining apparatus including a transfer mechanism portion transferring a tapered roller having a large end face directed outward in a radial direction by causing the tapered roller to revolve about a vertical line positioned on a side of a small end face of the tapered roller while causing the tapered roller to rotate, and a grinding wheel unit having a substantially C-shaped overall shape obtained by removing a part of a circle having the vertical line as the center, and having a grinding wheel surface that comes in sliding contact with the large end face of the transferred tapered roller on an inner peripheral side of the grinding wheel unit, wherein the grinding wheel unit has a seat that is fixed to an apparatus main body and has a substantially C-shaped overall shape, and a grinding wheel body that is separate from the seat, is detachably mounted to the seat, has a substantially C-shaped overall shape, and has the grinding wheel surface on an inner peripheral side of the grinding wheel body, and the grinding wheel body is constituted by a plurality of segments disposed along a circumferential direction.

According to the aspect, the substantially C-shaped grinding wheel body having the grinding wheel surface that comes in sliding contact with the large end face of the tapered roller can be mounted to and detached from the seat fixed to the apparatus main body of the machining apparatus, and is constituted by the plurality of segments disposed along the circumferential direction. Accordingly, when the large end face cannot obtain a desired shape or machining accuracy is reduced due to degradation of the grinding wheel surface resulting from continuous performance of machining of the large end face of the tapered roller by the machining apparatus, it is possible to perform maintenance management (including position adjustment and replacement) of only the grinding wheel body in a state in which the seat remains on the apparatus main body and, further, it is possible to perform the maintenance management of a part of the grinding wheel body (i.e., the segment) instead of the maintenance management of the entire grinding wheel body.

The grinding wheel unit may further have a mounting member that mounts each of the segments to the seat, and the mounting member may be configured to switch between a state in which movement of the segment in a radial direction with the vertical line as the center is allowed and a state in which the movement of the segment in the radial direction is prevented. In the case where the grinding wheel surface of the segment is worn and a radius is increased, a machining amount is reduced and the large end face of the tapered roller as the machining target cannot have the desired shape and accuracy. To cope with this, as the maintenance management of the segment, it is only necessary to move the segment inward in the radial direction using the mounting member, and re-mount (fix) the moved segment to the seat by preventing the movement of the segment relative to the seat. With this, it becomes possible to restore the segment such that the large end face of the tapered roller have the desired shape and accuracy.

The mounting member may have structure portions that make an amount of radial movement of one side portion of the segment in the circumferential direction different from an amount of radial movement of the other side portion of the segment in the circumferential direction, and mount the segment to the seat. One of the structure portions may be disposed on the one side portion of the segment and another structure portion may be disposed on the other side portion of the segment. In this case, it becomes possible to make the amount of the radial movement of one side portion of the segment in the circumferential direction different from the amount of radial movement of the other side portion of the segment in the circumferential direction, and mount (fix) the segment to the seat. For example, in the machining by this machining apparatus, the machining accuracy of the large end face is significantly influenced in an area on a side of the end of the machining, and hence, in the case where the machining amount of the grinding wheel surface of the segment corresponding to the area is reduced, it becomes possible to move the side closer to the end of the machining of the one side portion and the other side portion of the segment in the circumferential direction more inwardly in the radial direction than the side closer to the start of the machining, and mount (fix) the segment to the seat. With this, it becomes possible to restore the segment such that the large end face of the tapered roller as the machining target has the desired shape and accuracy.

The seat may have a positioning surface that comes in contact with an outer peripheral surface of the segment from inside in the radial direction. In this case, in the case where the segment is replaced, by bringing the outer peripheral surface of a new segment into contact with the positioning surface of the seat, it becomes possible to position the new segment, and a replacement operation is facilitated. In addition, in the case where the segment as the target of the maintenance management is moved inward in the radial direction and re-mounted (re-fixed), by interposing a shim plate between the positioning surface and the outer peripheral surface of the segment, it becomes possible to perform the position adjustment and positioning, and the maintenance management is facilitated.

The grinding wheel surface of the segment may have an inclined surface inclined in a direction that increases a radius of the grinding wheel surface with approach to an upstream side in a direction of transfer of the tapered roller, at an end portion on the upstream side. Since the grinding wheel body is constituted by a plurality of the segments, when the transferred tapered roller moves from the segment on the upstream side in the transfer direction to the adjacent segment on a downstream side (when the tapered roller crosses a join), there is a possibility that the large end face of the tapered roller is caught on the end portion on the upstream side of the grinding wheel surface of the segment on the downstream side. However, according to the inclined surface, it is possible to prevent the large end face from being caught thereon.

A second aspect of the invention is a grinding wheel body separate from a seat provided in a machining apparatus machining a large end face of a tapered roller and detachably mounted to the seat, including a plurality of segments each having a grinding wheel surface that comes in sliding contact with the large end face on an inner peripheral side of the segment, and constituting a substantially C-shape by being disposed along a circumferential direction. According to the invention, when the large end face cannot obtain the desired shape or the machining accuracy is reduced due to degradation of the grinding wheel surface resulting from continuous performance of machining of the large end face of the tapered roller by the machining apparatus, it is possible to perform the maintenance management (including the position adjustment and the replacement) of only the grinding wheel body in the state in which the seat remains on the apparatus main body of the machining apparatus and, further, it is possible to perform the maintenance management of a part of the grinding wheel body (i.e., the segment) instead of the maintenance management of the entire grinding wheel body.

According to the second aspect, it is possible to perform the maintenance management of only the grinding wheel body in the state in which the seat remains on the apparatus main body of the machining apparatus and, further, it is possible to perform the maintenance management of a part of the grinding wheel body (i.e., the segment) instead of the maintenance management of the entire grinding wheel body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
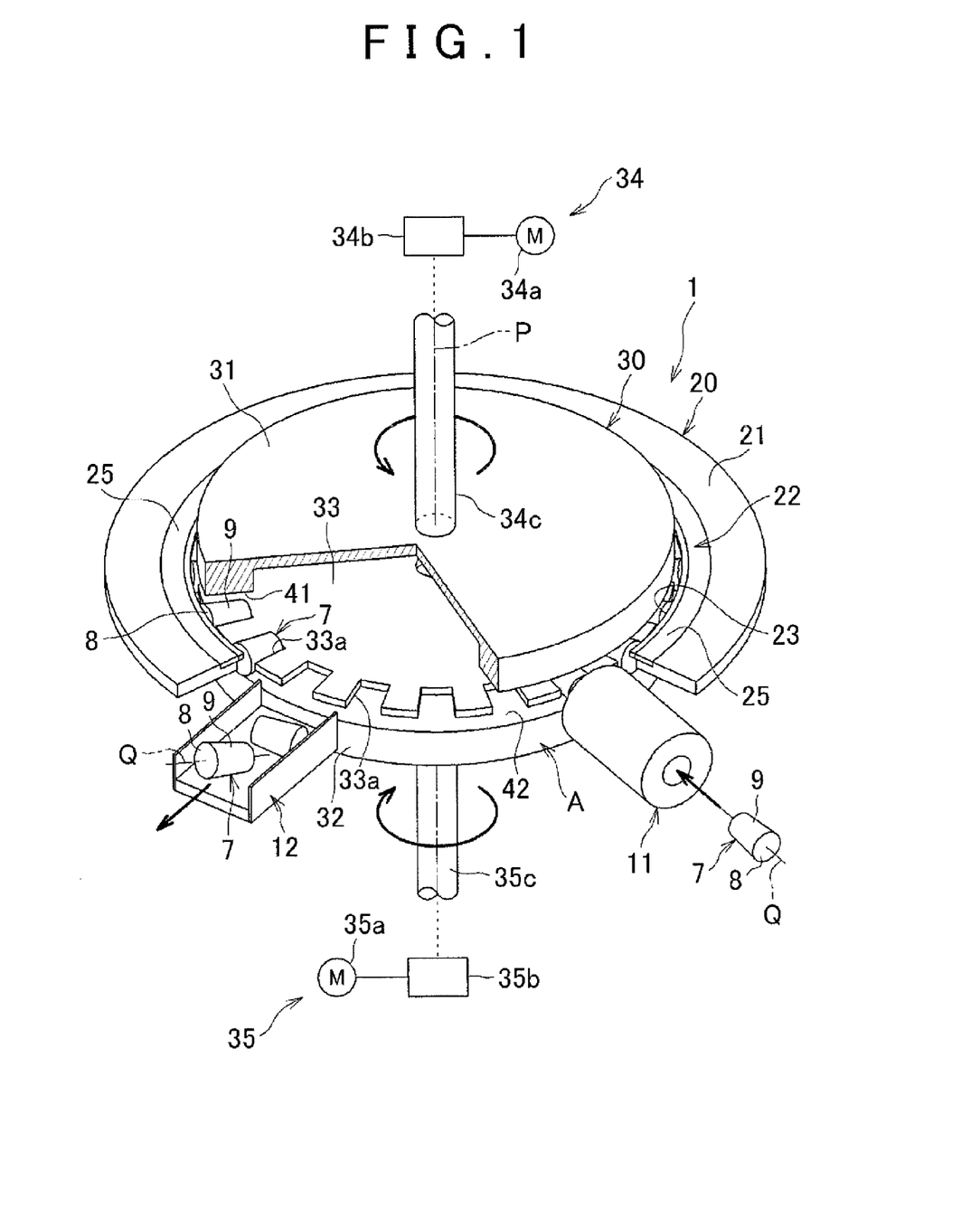
FIG. 1 is a perspective view showing a schematic configuration of an embodiment of a machining apparatus of the invention.

Hereinbelow, an embodiment of the invention will be described based on the drawings. FIG. 1 is a perspective view showing a schematic configuration of an embodiment of a machining apparatus 1 of the invention. The machining apparatus 1 is an apparatus (a grinding apparatus or a lapping apparatus) for machining (grinding or lapping) a large end face 8 of a tapered roller 7 for a tapered roller bearing, and the machining is performed by bringing the large end face 8 into sliding contact with a fixed grinding wheel surface 23 while transferring the tapered roller 7. For this machining, the machining apparatus 1 includes a transfer mechanism portion 30 and a grinding wheel unit 20 having the grinding wheel surface 23. The transfer mechanism portion 30 transfers the tapered roller 7. The grinding wheel surface 23 comes in sliding contact with the large end face 8 of the tapered roller 7 that is transferred by the transfer mechanism portion 30.

Figure 2:
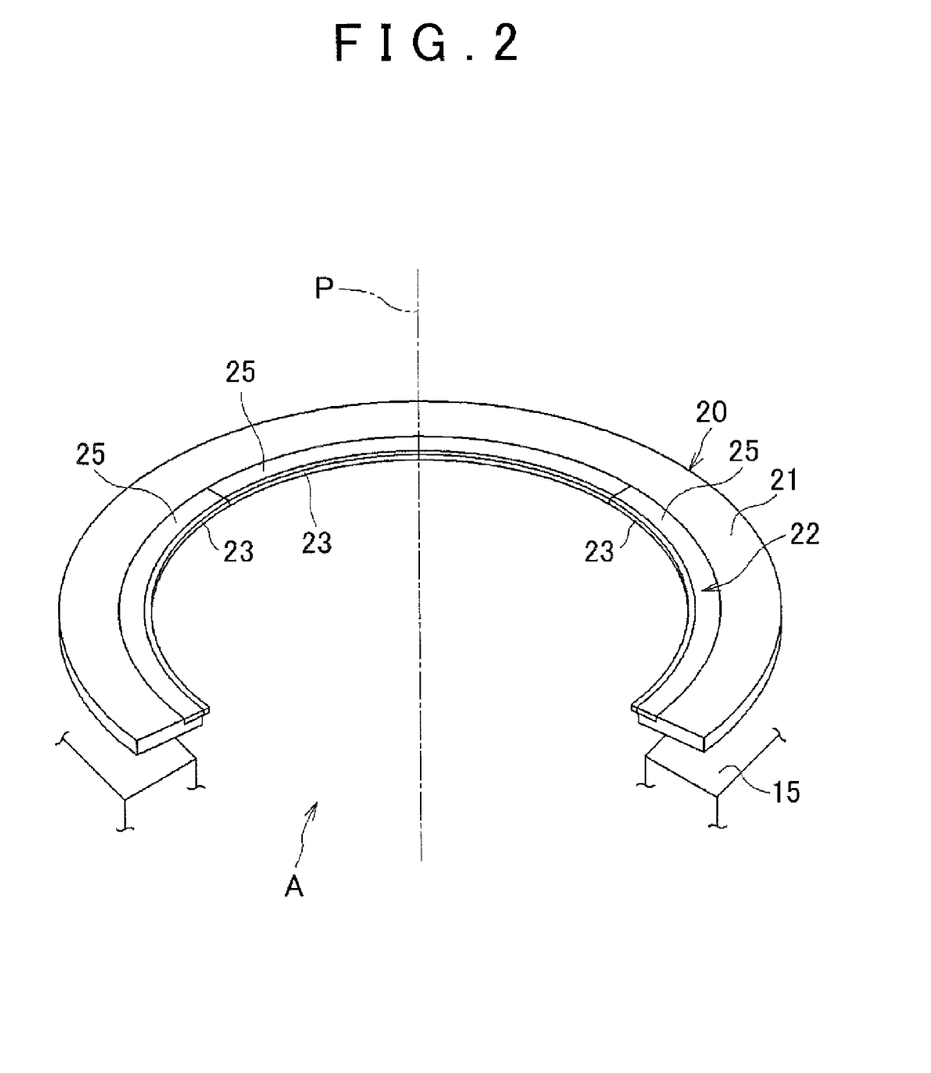
FIG. 2 is a perspective view of a grinding wheel unit.
Figure 3:
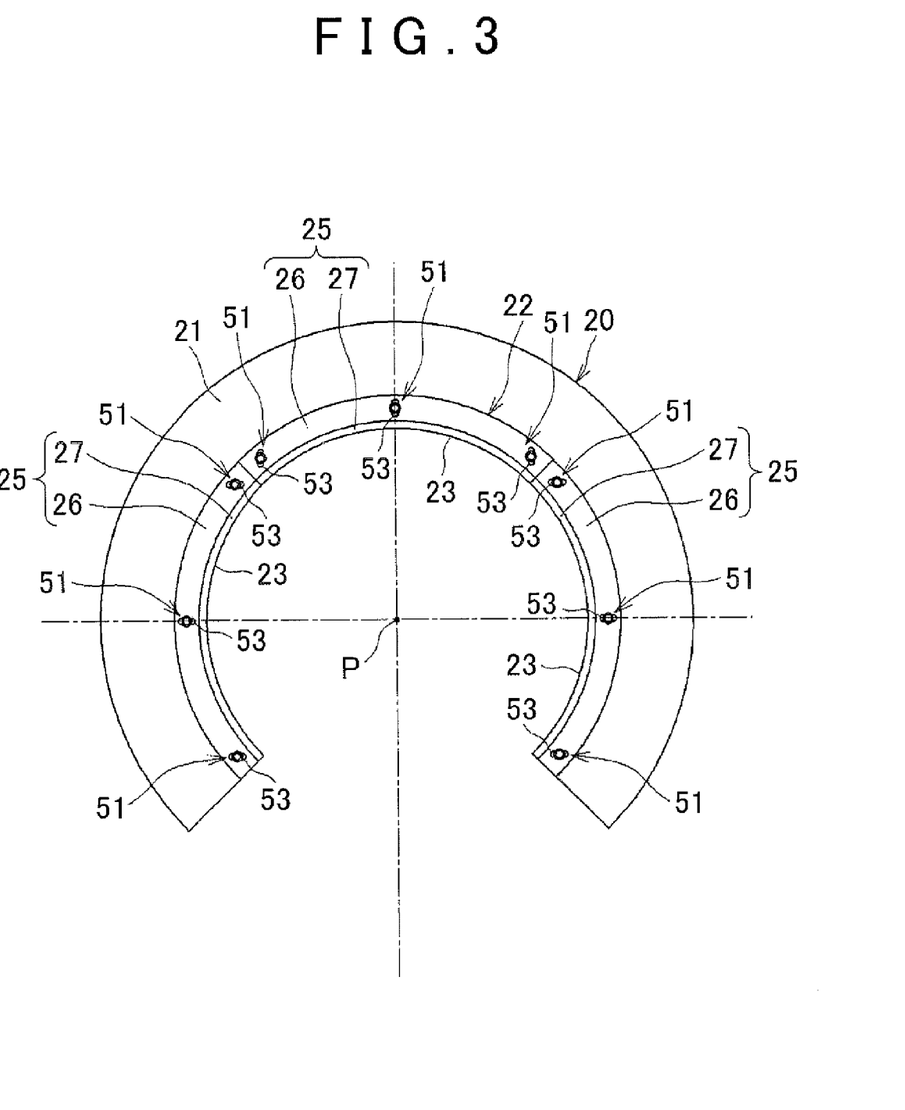
FIG. 3 is a plan view of the grinding wheel unit.

FIG. 2 is a perspective view of the grinding wheel unit 20. FIG. 3 is a plan view of the grinding wheel unit 20. The overall shape of the grinding wheel unit 20 is a shape obtained by removing a part of a circle having a vertical line P as the center (also referred to as a C-shape or a horseshoe shape). That is, there is an area A where the grinding wheel unit 20 (the grinding wheel surface 23) is absent (missing) in a part of the circle having the vertical line P as the center in a circumferential direction. The configuration of the grinding wheel unit 20 will be described in detail later.

As shown in FIG. 1, the transfer mechanism portion 30 includes an upper board 31, a lower board 32, a holding board 33, an upper drive portion 34 that rotates the upper board 31, and a lower drive portion 35 that rotates the lower board 32. Note that, in FIG. 1, a part of the upper board 31 is shown as a cross section. In addition, in the machining apparatus 1, a loading portion 11 and an ejection portion 12 are provided in the area A. In the loading portion 11, the tapered roller 7 as a machining target is loaded into a space between the upper board 31 and the lower board 32. Note that the tapered roller 7 is loaded such that the large end face 8 thereof is directed outward in a radial direction with the vertical line P as the center. In the ejection portion 12, the tapered roller 7 of which the machining is ended is ejected from between the upper board 31 and the lower board 32.

The upper board 31 is a disk-like member having the vertical line P as the center, and has an annular upper contact surface 41 with which an outer peripheral surface 9 of the tapered roller 7 is in contact in an outer peripheral edge portion of its lower surface. The upper drive portion 34 includes a motor 34a and a final reduction gear 34b that reduces the RPM of the motor 34a, and rotates a drive shaft 34c on an output side of the final reduction gear 34b with rotation of the motor 34a. The drive shaft 34c gives a rotational force to the upper board 31 to cause the upper board 31 to rotate in one direction (a counterclockwise direction in the case of FIG. 1) on the vertical line P.

The lower board 32 is a disk-like member having the vertical line P as the center, and has an annular lower contact surface 42 with which the outer peripheral surface 9 of the tapered roller 7 is in contact in an outer peripheral edge portion of its upper surface. The lower drive portion 35 includes a motor 35a and a final reduction gear 35b that reduces the RPM of the motor 35a, and rotates a drive shaft 35c on an output side of the final reduction gear 35b with rotation of the motor 35a. The drive shaft 35c gives the rotational force to the lower board 32 to cause the lower board 32 to rotate in the other direction (a clockwise direction in the case of FIG. 1) on the vertical line P.

The tapered roller 7 as the machining target that is loaded into the space between the upper board 31 and the lower board 32 is sandwiched between the upper contact surface 41 and the lower contact surface 42 in a vertical direction. An annular space having a wedge-shaped (a wedge-shape that becomes wider with approach to the outside in the radial direction) cross section is formed between the upper contact surface 41 and the lower contact surface 42, and hence thrust toward the outside in the radial direction is produced in the tapered roller 7 that is sandwiched between the upper contact surface 41 and the lower contact surface 42. The transfer mechanism portion 30 is constituted such that the cone center of the tapered roller 7 (the vertex of a cone that defines the tapered roller 7) as the machining target is positioned on the vertical line P. The upper board 31 and the lower board 32 rotate in opposite directions, and the rotational speeds (RPMs) of the upper board 31 and the lower board 32 are different from each other. In the present embodiment, the rotational speed of the upper board 31 is set to be higher than that of the lower board 32.

The holding board 33 is supported between the upper board 31 and the lower board 32 so as to be rotatable on the vertical line P. A plurality of concave portions (pockets) 33a for accommodating the tapered roller 7 are formed in an outer peripheral edge portion of the holding board 33. The plurality of concave portions 33a are formed along the circumferential direction, and are disposed at regular intervals. One tapered roller 7 is accommodated in one concave portion 33a.

According to the transfer mechanism portion 30, the upper board 31 rotates on the vertical line P in one direction, the lower board 32 rotates on the vertical line P in the other direction, and the upper board 31 rotates at the rotational speed higher than that of the lower board 32. As a result, it is possible to cause the tapered roller 7 that has the large end face 8 directed outward in the radial direction and is interposed between the upper contact surface 41 and the lower contact surface 42 to revolve about the vertical line P positioned on the side of a small end face (the cone center) of the tapered roller 7 while causing the tapered roller 7 to rotate on a roller axis Q of the tapered roller 7. With this, the tapered roller 7 is transferred along the grinding wheel surface 23 from the side of the loading portion 11 to the side of the ejection portion 12 with the vertical line P as the center. Note that the holding board 33 is pushed by the moving tapered roller 7 and rotates.

According to the machining apparatus 1 having the configuration described above, the machining is performed by successively loading the tapered roller 7 from the loading portion 11 provided in a part of the area A, and bringing the large end face 8 of the tapered roller 7 into sliding contact with the fixed grinding wheel surface 23 while causing the loaded tapered roller 7 to revolve about the vertical line P with the large end face 8 directed outward in the radial direction. Note that the revolving tapered roller 7 also rotates on its roller axis Q. The tapered roller 7 makes substantially one revolution along the substantially C-shaped grinding wheel surface 23, whereby the machining of the large end face 8 is completed, and the tapered roller 95 of which the machining is ended is successively ejected from the ejection portion 12 provided in the other part of the area A.

The configuration of the grinding wheel unit 20 will be described. The grinding wheel unit 20 has a seat 21 fixed to an apparatus main body 15 (see FIG. 2) of the machining apparatus 1 via a jig (not shown) and the like. The overall shape of the seat 21 is a substantially C-shape obtained by removing a part of the circle having the vertical line P as the center (see FIGS. 2 and 3). The seat 21 is made of steel. In addition, the grinding wheel unit 20 has a grinding wheel body 22 that is separate from the seat 21 and is detachably mounted to the seat 21. The overall shape of the grinding wheel body 22 is a substantially C-shape obtained by removing a part of the circle having the vertical line P as the center, and has the grinding wheel surface 23 on the inner peripheral side thereof.

Further, the grinding wheel body 22 has a plurality of segments 25. That is, the grinding wheel body 22 is divided into the plurality of the segments 25 disposed along the circumferential direction. In the present embodiment, the substantially C-shaped grinding wheel body 22 is divided into three and has three arc-shaped segments 25. Each segment 25 has an arc-shaped steel base 26 and an arc-shaped grinding wheel portion 27 fixed along the inner periphery of the base 26. The inner peripheral surface of the grinding wheel portion 27 serves as the grinding wheel surface 23.

Each of these three segments 25 is detachably mounted to the seat 21 and, for this mounting, the grinding wheel unit 20 has mounting members 51 (see FIG. 4) for mounting the segment 25 to the seat 21.

Figures 7A, 7B:
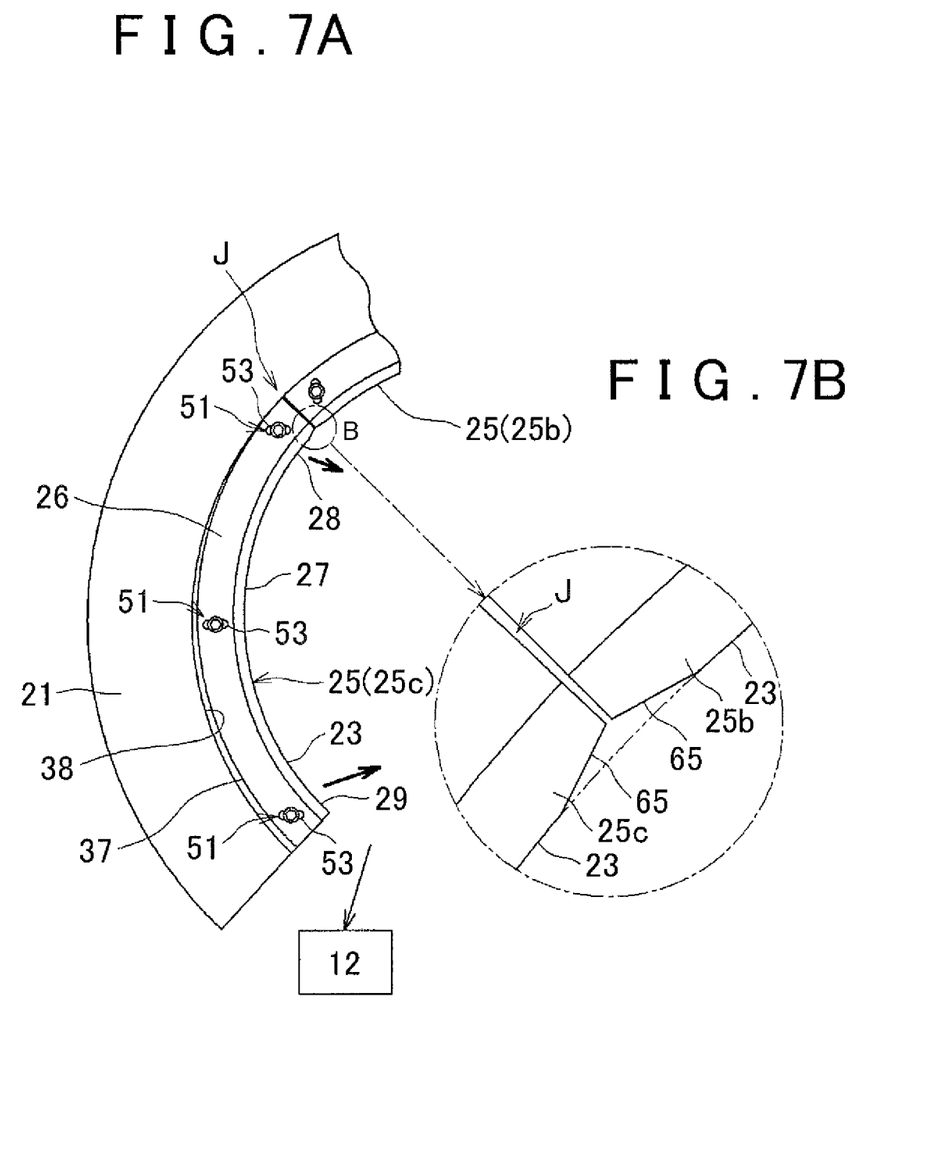
FIG. 7A is an explanatory view showing a part of the grinding wheel unit.
FIG. 7B is an enlarged view of a principal part of FIG. 7A.

The mounting member 51 of the present embodiment has a bolt 52, and the bolt 52 extends through a through hole 53 provided in the base 26, and is screwed with a bolt hole 54 provided in the seat 21. As shown in FIG. 7, the mounting members 51 including the bolts 52, the through holes 53, and the bolt holes 54 are provided at least on one side portion 28 in the circumferential direction and on the other side portion 29 therein in one segment 25. Note that, in the present embodiment, another mounting member 51 is also provided at the center along the circumferential direction.

Figure 4:
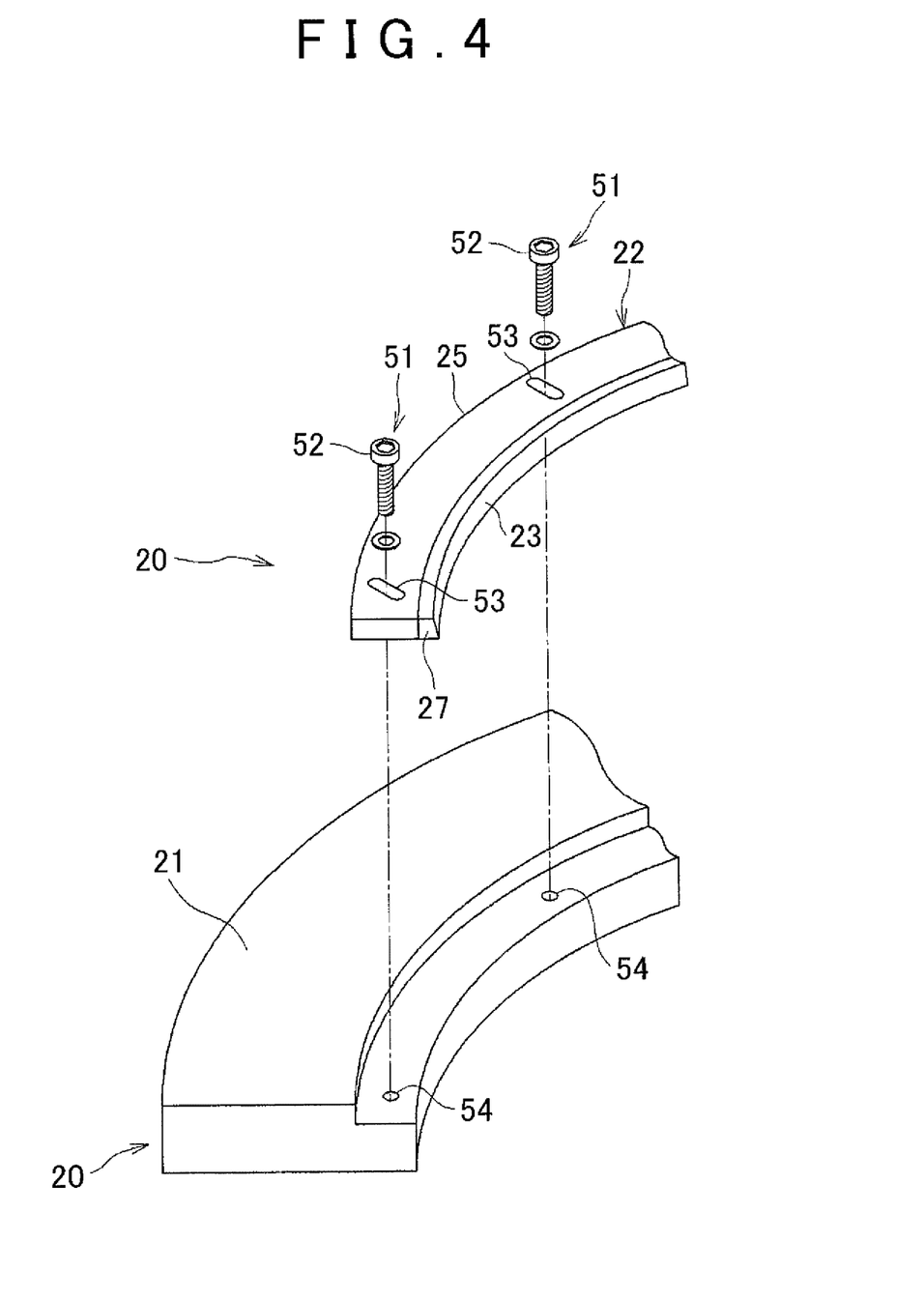
FIG. 4 is an exploded perspective view of a part of the grinding wheel unit.

As shown in FIG. 4, the through hole 53 is constituted by an elongated hole, and the longitudinal direction of each of a plurality of (three in the present embodiment) the elongated holes (the through holes 53) in one segment 25 is parallel with the radial direction at the central position of the segment 25 in the circumferential direction (see FIGS. 3 and 7). In the present embodiment, one elongated hole is provided at the central position in the circumferential direction as the through hole 53 in the segment 25, and hence the longitudinal direction of the elongated hole at the center matches the radial direction at the central position of the segment 25 in the circumferential direction, and the longitudinal direction of each of the elongated holes on both sides is parallel with the longitudinal direction of the elongated hole at the center. Note that the elongated hole includes an oblong hole. Accordingly, the movement of the segment 25 in the radial direction with the vertical line P (see FIG. 3) as the center relative to the seat 21 is allowed in a state in which the bolt 52 is loosened, and the movement of the segment 25 relative to the seat 21 is prevented by tightening the bolt 52, and the segment 25 can be thereby fixed. Thus, the mounting member 51 is capable of switching between the state in which the movement of the segment 25 in the radial direction is allowed and the state in which the movement thereof is prevented, and has a function of mounting the segment 25 to the seat 21. Note that the through hole 53 constituted by the elongated hole has a hole dimension (hole width) larger than the diameter of the bolt 52 (screw shaft portion) in a direction orthogonal to the longitudinal direction, and the segment 25 can move in the longitudinal direction, and can also move a short distance in the direction intersecting (orthogonal to) the longitudinal direction. In addition, in the present embodiment, the case where the through hole 53 is the elongated hole is described, but the through hole 53 may also be a hole other than the elongated hole, and may be any hole as long as the hole has a hole dimension larger than the diameter of the bolt 52 (the screw shaft portion) such that the segment 25 can move. A gap is provided between the circumferential end surfaces of the segments 25 adjacent to each other in the circumferential direction (a join J shown in an enlarged view in FIG. 7), and the gap facilitates the movement of the segment 25.

In the case where the machining of the large end face 8 of the tapered roller 7 by the machining apparatus 1 (see FIG. 1) is continuously performed, there are cases where the grinding wheel surface 23 is degraded, and the large end face 8 cannot obtain a desired shape or machining accuracy is reduced. To cope with this, maintenance management of the machining apparatus 1 is required. According to the grinding wheel unit 20 of the present embodiment, in a state in which the seat 21 remains on the apparatus main body 15 (see FIG. 2) of the machining apparatus 1, it is possible to set only the grinding wheel body 22 as the target of the maintenance management (including position adjustment and replacement) and, further, it is possible to set a part of the grinding wheel body 22 (the segment 25) as the target of the maintenance management instead of the entire grinding wheel body 22.

In particular, in the case where the grinding wheel surface 23 of the segment 25 is worn and a radius (inner diameter) is increased, a machining amount is reduced, and the large end face 8 of the tapered roller 7 as the machining target cannot have the desired shape and accuracy. To cope with this, as the maintenance management of the segment 25, the segment 25 is moved inward in the radial direction using the mounting member 51 (see FIG. 4), and the moved segment 25 is re-mounted (re-fixed) to the seat 21 by preventing the movement of the segment 25 relative to the seat 21. With this, it becomes possible to restore the segment 25 such that the large end face 8 of the tapered roller 7 has the desired shape and accuracy.

In addition, according to the through hole 53 constituted by the elongated hole included in the mounting member 51, in a plurality of (three) the mounting members 51, the positions of the bolt 52 relative to the through hole 53 can be made different from each other and, with this, as shown in FIG. 7, the amount of the radial movement (a movement of a direction parallel with the radial direction) of one side portion 28 of the segment 25 in the circumferential direction can be made different from that of the radial movement of the other side portion 29 of the segment 25 in the circumferential direction, and the segment 25 can be mounted (fixed) to the seat 21. Thus, the mounting members 51 have structure portions (the through holes 53 constituted by the elongated holes) that make the amount of the radial movement of one side portion 28 of the segment 25 in the circumferential direction different from the amount of the radial movement of the other side portion 29 of the segment 25 in the circumferential direction, and mount the segment 25 to the seat 21. At least one of the structure portions is disposed on the one side portion 28 and at least another structure portion is disposed on the other side portion 29.

In the machining by the machining apparatus 1, in an area on a side of the end of the machining, i.e., on a side close to the ejection portion 12 (see FIG. 1), the machining accuracy of the large end face 8 of the tapered roller 7 is significantly influenced. Accordingly, in the case where the machining amount of the grinding wheel surface 23 of the segment indicated by a reference numeral 25c in FIG. 7 on the side of the end of the machining is reduced, according to the mounting member 51 of the present embodiment, it becomes possible to move the side of the segment 25c closer to the end of the machining (the other side portion 29 in the circumferential direction) inward in the redial direction by a distance longer than the distance of the movement of the side of the segment 25c closer to the start of the machining (one side portion 28 in the circumferential direction), and fix the segment 25c to the seat 21. With this, even in the case where the machining of the large end face 8 of the tapered roller 7 is continuously performed, by performing the maintenance management described above, it becomes possible to easily restore the segment 25c such that the large end face 8 of the tapered roller 7 as the machining target has the desired shape and accuracy.

Note that, with regard to the movement of the segment 25, as described above, the amounts of the radial movement of one side portion 28 in the circumferential direction and the radial movement of the other side portion 29 in the circumferential direction may be made different from each other so that the segment 25 is inclined relative to the original state, and then the segment 25 may be mounted and fixed, but the amounts of the radial movement of one side portion 28 in the circumferential direction and the radial movement of the other side portion 29 in the circumferential direction may also be made equal to each other, and then the segment 25 may be mounted and fixed.

Figure 8A:
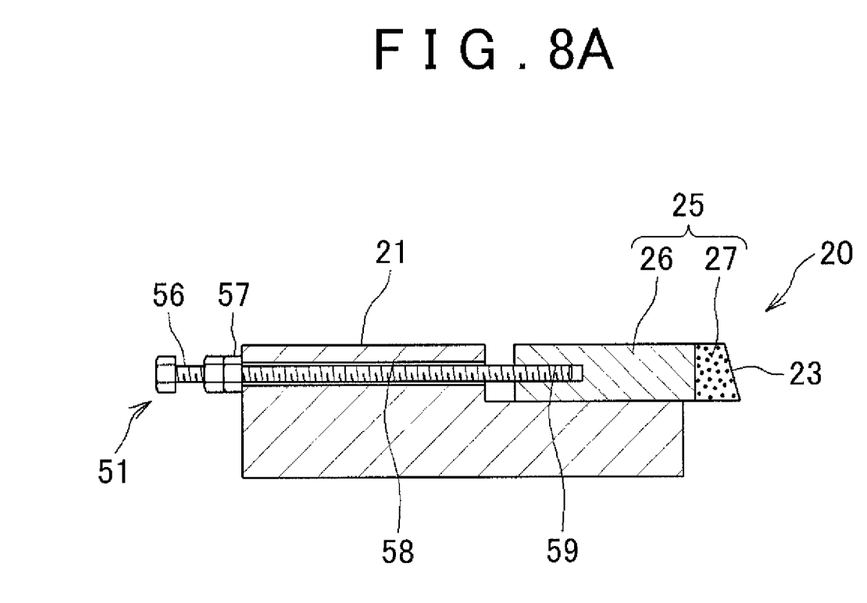
FIGS. 8A and 8B are explanatory views of other mounting members.
Figure 8B:
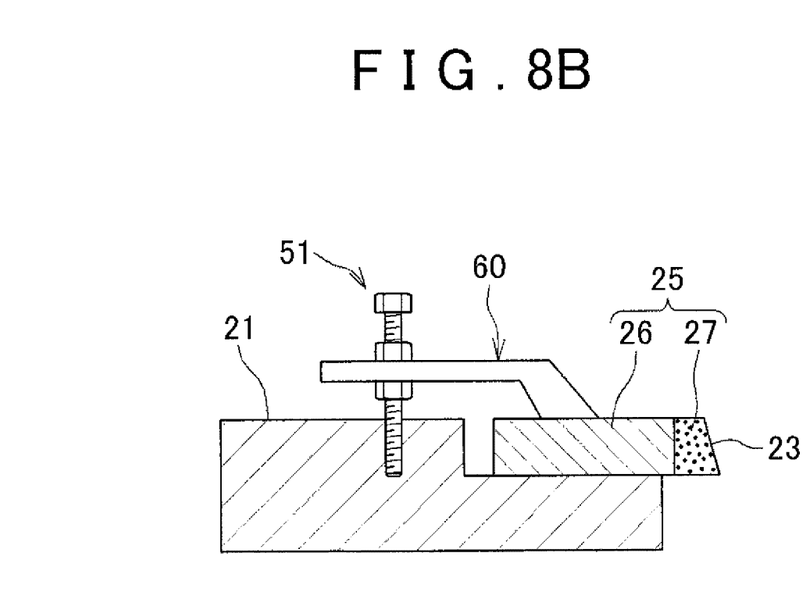

In addition, the mounting member 51 may also have the configuration other than the configuration that includes the bolt 52, the through hole 53, and the like. For example, as shown in FIG. 8A, the mounting member 51 may have the configuration that includes a bolt 56, a nut 57, a through hole 58 that is formed in the seat 21 so as to pass therethrough in the radial direction, and a radial bolt hole 59 that is formed in the base 26 so as to be opened in the outer peripheral surface. Alternatively, as shown in FIG. 8B, the mounting member 51 may also be a clamp member 60 capable of position adjustment in the vertical direction and fixing the base 26 by sandwiching the base 26 between the clamp member 60 and a part of the seat 21.

Figure 5:
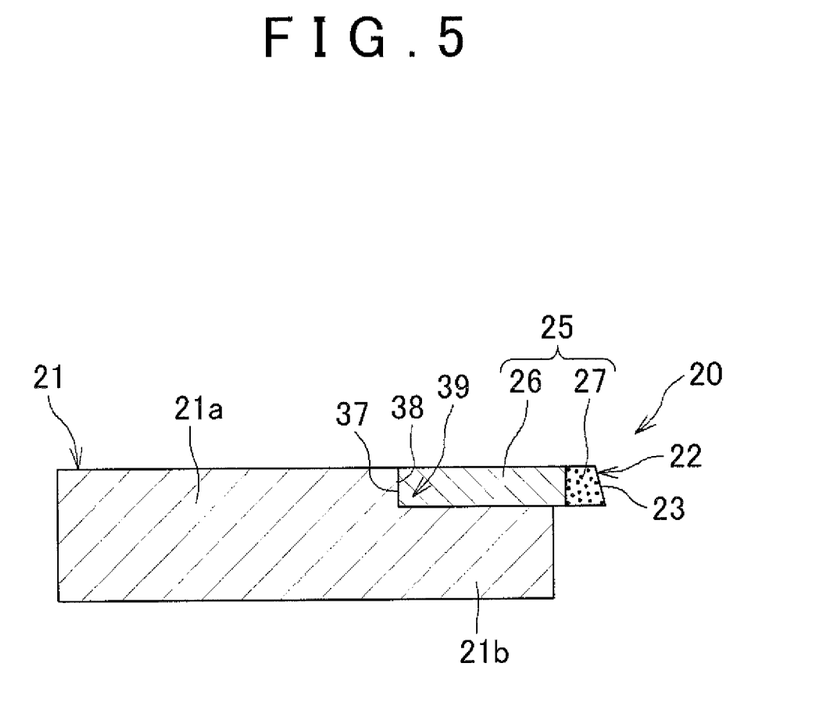
FIG. 5 is a cross-sectional view of the grinding wheel unit.
Figure 6:
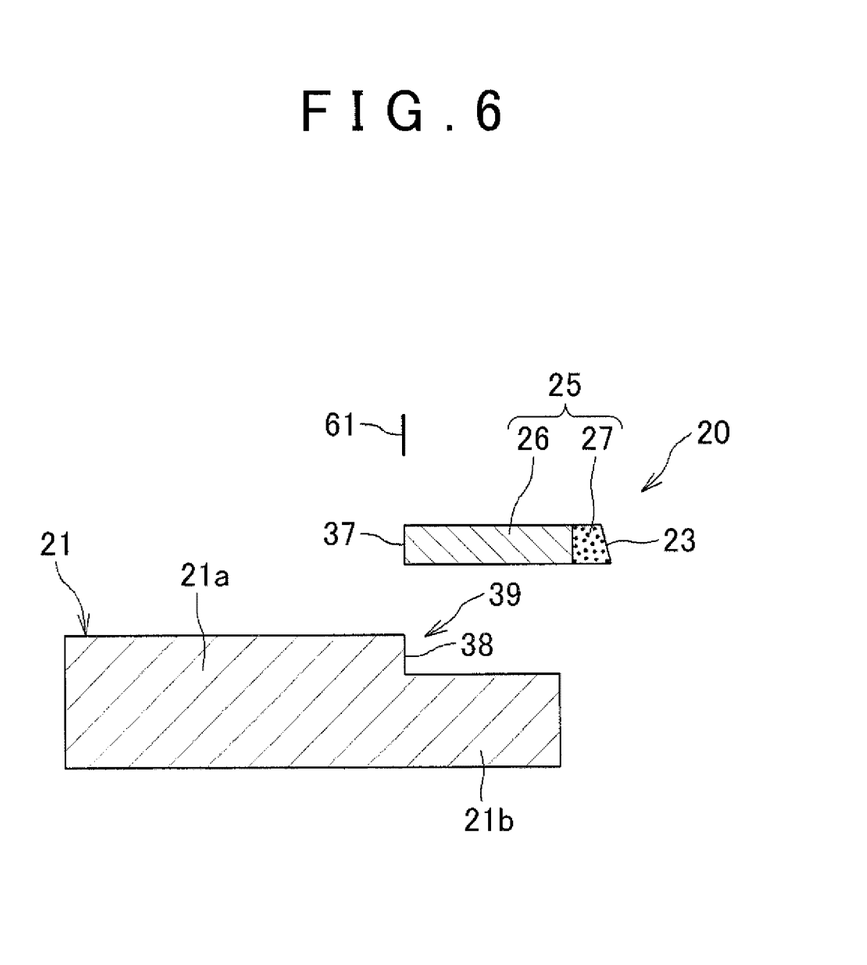
FIG. 6 is an exploded cross-sectional view of the grinding wheel unit shown in FIG. 5.

As shown in FIGS. 5 and 6, the substantially C-shaped seat 21 has a substantially C-shaped main body portion 21a and a substantially C-shaped protruding portion 21b that is lower than the main body portion 21a and extends inward in the radial direction from the main body portion 21a, and a stepped portion 39 is formed on the side of an upper surface. The surface of the stepped portion 39 facing inward in the radial direction serves as a positioning surface 38, and an outer peripheral surface 37 of the segment 25 (the base 26) comes in contact with the positioning surface 38 from inside in the radial direction. The positioning surface 38 and the outer peripheral surface 37 are machined surfaces subjected to the machining. In addition, the lower surface of the segment 25 comes in contact with the upper surface of the protruding portion 21b, and hence the upper surface and the lower surface are also machined surfaces.

According to the configuration that includes the positioning surface 38, in the case where the segment 25 is replaced, by bringing the outer peripheral surface 37 of the new segment 25 into contact with the positioning surface 38 of the seat 21, it becomes possible to perform positioning (alignment) of the new segment 25, and a replacement operation is thereby facilitated. In the case where the segment 25 as the target of the maintenance management is moved inward in the radial direction and is re-mounted (re-fixed), by interposing a shim plate 61 (see FIG. 6) between the positioning surface 38 and the outer peripheral surface 37 of the segment 25, it becomes possible to perform the position adjustment and the positioning (alignment), and the maintenance management is thereby facilitated. In addition, by forming each surface that is brought into contact as the machined surface, it is possible to increase the accuracy of the positioning.

In addition, in the present embodiment, since the grinding wheel body 22 is constituted by the three segments 25, when the transferred tapered roller 7 moves from a segment 25b (see FIG. 7A) on the upstream side in a transfer direction to the adjacent segment 25c (see FIG. 7A) on the downstream side (when the tapered roller 7 crosses the join J), there is a possibility that the large end face 8 of the tapered roller 7 is caught on the end portion on the upstream side of the grinding wheel surface 23 of the segment 25c on the downstream side. To cope with this, in the present embodiment, as shown in FIG. 7B, an inclined surface 65 is formed at the end portion of the grinding wheel surface 23 between the adjacent segments 25b and 25c. The inclined surface 65 is the surface that increases the radius with approach to the end portion (circumferential end portion) of each segment 25 in the circumferential direction.

Note that, in the present embodiment, the grinding wheel surface 23 of each segment 25 has the inclined surfaces 65 on both sides in the circumferential direction, but it is only necessary for the grinding wheel surface 23 to have the inclined surface 65 that increases the radius with approach to the upstream side at least at the end portion on the upstream side in the direction of transfer of the tapered roller 7. According to the inclined surface 65, it becomes possible to prevent the tapered roller 7 from getting caught when the tapered roller 7 crosses the join J, as described above.

As described thus far, the grinding wheel body 22 of the present embodiment is separate from the seat 21 provided in the machining apparatus 1 (the apparatus main body 15) that machines the large end face 8 of the tapered roller 7, and is detachably mounted to the seat 21. In addition, the overall shape of the grinding wheel body 22 is the substantially C-shape obtained by removing a part of the circle, and has the grinding wheel surface 23 that comes in sliding contact with the large end face 8 of the tapered roller 7 on the inner peripheral side. Further, the grinding wheel body 22 has the plurality of the segments 25, and is formed into the substantially C-shape as the overall shape by disposing the segments 25 along the circumferential direction.

According to the machining apparatus 1 that includes the grinding wheel body 22, it becomes possible to form the inner peripheral shape of the grinding wheel body 22, i.e., a shape having a curvature substantially equal to that of the shape of the grinding wheel surface 23 on the large end face 8 of the tapered roller 7. When the large end face 8 cannot obtain the desired shape or the machining accuracy is reduced due to degradation of the grinding wheel surface 23 resulting from continuous performance of the machining of the large end face 8 of the tapered roller 7 by the machining apparatus 1, it is possible to perform the maintenance management (including the position adjustment and replacement) of only the grinding wheel body 22 in the state in which the seat 21 remains on the apparatus main body 15 of the machining apparatus 1 and, further, it is also possible to perform the maintenance management of a part of the grinding wheel body 22 (the segment 25) instead of the maintenance management of the entire grinding wheel body 22. Accordingly, it becomes possible to reduce the cost required for the maintenance management.

As described above, in the case where the large end face 8 of the tapered roller 7 is machined while the tapered roller 7 is transferred along the substantially C-shaped grinding wheel surface 23, the machining accuracy of the large end face 8 is significantly influenced in the area on the downstream side in the transfer direction (the area close to the ejection portion 12). That is, the large end face 8 that is machined while revolving about the vertical line P becomes a curved surface, and the radius of the curved surface (the radius of curvature) becomes substantially equal to the radius of the grinding wheel surface 23 of the segment 25c positioned in the area on the downstream side in the transfer direction (see FIG. 7), and the machining is ended. Accordingly, the final shape of the large end face 8 is determined according to the shape of the grinding wheel surface 23 of the segment 25c in the area on the downstream side in the transfer direction in particular.

In order to adjust the curvature (the shape of the curved surface) of the large end face 8 in the area on the downstream side in the transfer direction, in the machining apparatus 1 of the present embodiment, the movement (the position adjustment) of the segment 25c on the most downstream side relative to the seat 21 is allowed by the mounting member 51, and the segment 25c can be fixed to the seat 21. Moreover, as described above (see FIG. 7), it is possible to make the amount of the radial movement of one side portion 28 of the segment 25c in the circumferential direction different from that of the radial movement of the other side portion 29 of the segment 25c in the circumferential direction, and mount the segment 25c to the seat 21. By performing the maintenance management of the grinding wheel body 22 (the segment 25c) with this configuration, it is possible to stabilize the curvature of the large end face 8 of the tapered roller 7.

In addition, in the present embodiment, it is possible to cause one grinding wheel body 22 that includes a plurality of the segments 25 to include the segments 25 having different grain sizes (grit numbers) of the grinding wheel portion 27, and one grinding wheel body 22 may be constituted by arranging these segments 25 in the circumferential direction. For example, the grain size of the segment 25 on the side close to the ejection portion 12 can be made smaller than the grain size of the segment 25 on the side close to the loading portion 11.

Further, the maintenance management of a plurality of the segments 25 included in the grinding wheel body 22 includes the maintenance management performed by moving the segment 25 (the position adjustment) and the maintenance management performed by replacing the segment 25. In the case of the former, all of the segments 25 may be moved or only a part (one) of the segments 25 may also be moved. In the case of the latter, all of the segments 25 may be replaced or only a part (one) of the segments 25 may also be replaced. In the case where a part (one) of the segments 25 is moved or replaced, the segment 25 on the side of the ejection portion 12 is moved or replaced. In each of the case where the segment 25 is moved and the case where the segment 25 is replaced, by performing the positioning of the segment 25 to be moved or replaced by using the positioning surface 38 of the seat 21, the operation of the maintenance management is facilitated.

In addition, for example, in order to change the setting of the grinding wheel body 22 or set the grinding wheel surface 23, it is necessary to detach the grinding wheel body 22 from the seat 21 without detaching the seat 21, and perform centering (position adjustment) when the grinding wheel body 22 is re-mounted. According to the present embodiment, since the seat 21 having a large volume is left on the apparatus main body 15 and the segment 25 having a small volume is handled, it becomes possible to reduce its operation time, and the transfer of the new and old segments 25 is facilitated. In addition, with regard to the replaced segment 25, the new grinding wheel portion 27 may be formed (re-attached to) in the base 26 included in the segment 25, and the replaced used segment 25 may also be abandoned.

Further, the machining apparatus of the invention is not limited to the embodiment shown in the drawings, and may have other embodiments within the scope of the invention. Although the above embodiment has described the case where the substantially circular grinding wheel body 22 is constituted by three elements, the number of elements is not limited thereto, and can be changed. In addition, although the above embodiment (see FIGS. 3 and 7) has described the case where the longitudinal direction of each of the plurality of (three in the present embodiment) the elongated holes (the through holes 53) in one segment 25 is parallel with the radial direction at the central position of the segment 25 in the circumferential direction, the longitudinal direction may be a direction other than the direction shown in the drawing, and can be changed.

What is claimed is:

1. A machining apparatus having a vertical line as a central axis, the machining apparatus provided for machining an end face of a tapered roller, the machining apparatus comprising:
   a transfer mechanism portion that is configured to transfer a tapered roller having a large end face directed outward in a radial direction by causing the tapered roller to revolve about the vertical line positioned on a side of a small end face of the tapered roller while causing the tapered roller to rotate; and
   a grinding wheel unit having a substantially C-shaped overall shape having the vertical line as the center, and having a grinding wheel surface that comes in sliding contact with the large end face of the transferred tapered roller on an inner peripheral side of the grinding wheel unit, wherein
   the grinding wheel unit has a seat that is fixed to an apparatus main body and has a substantially C-shaped overall shape, and a grinding wheel body that is separate from the seat, is detachably mounted to the seat, has a substantially C-shaped overall shape, and has the grinding wheel surface on an inner peripheral side of the grinding wheel body, and
   the grinding wheel body is constituted by a plurality of segments disposed along a circumferential direction.

2. The machining apparatus according to claim 1, wherein the grinding wheel unit further has a mounting member that mounts each of the segments to the seat, and the mounting member is configured to switch between a state in which movement of the segment in a radial direction with the vertical line as the center is allowed and a state in which the movement of the segment in the radial direction is prevented.

3. The machining apparatus according to claim 2, wherein the mounting member has structure portions that make an amount of radial movement of one side portion of the segment in the circumferential direction different from an amount of radial movement of the other side portion of the segment in the circumferential direction, and mount the segment to the seat; and
   one of the structure portions is disposed on the one side portion of the segment and another structure portion is disposed on the other side portion of the segment.

4. The machining apparatus according to claim 1, wherein the seat has a positioning surface that comes in contact with an outer peripheral surface of the segment from inside in the radial direction.

5. The machining apparatus according to claim 1, wherein the grinding wheel surface of the segment has an inclined surface inclined in a direction that increases a radius of the grinding wheel surface with approach to an upstream side in a direction of transfer of the tapered roller, at an end portion on the upstream side.

6. A grinding wheel body separate from a seat provided in a machining apparatus, the machining apparatus having a vertical line as a central axis, the machining apparatus machining a large end face of a tapered roller and detachably mounted to the seat, the grinding wheel body comprising:
- a plurality of segments each having a grinding wheel surface that comes in sliding contact with the large end face on an inner peripheral side of the segment, and constituting a substantially C-shape as an overall shape by being disposed along a circumferential direction, wherein:
- the grinding wheel body is a part of a grinding wheel unit that includes the seat separate from the grinding wheel body,
- the grinding wheel unit further has a mounting member that mounts each of the segments to the seat, and
- the mounting member is configured to switch between a state in which movement of the segment in a radial direction with the vertical line as the center is allowed and a state in which the movement of the segment in the radial direction is prevented.

\* \* \* \* \*